United States Patent [19]

Miller et al.

[11] Patent Number: 5,252,207

[45] Date of Patent: Oct. 12, 1993

[54] WRAP MEMBER HAVING OPENINGS

[75] Inventors: John D. Miller, Ithaca; Kenneth M. Williamson, LaFayette; Joseph R. Swiezbin, Glen Head, all of N.Y.

[73] Assignee: Pall Corporation, Glen Cove, N.Y.

[21] Appl. No.: 733,625

[22] Filed: Jul. 22, 1991

Related U.S. Application Data

[63] Continuation-in-part of Ser. No. 559,335, Jul. 30, 1990, abandoned, which is a continuation-in-part of Ser. No. 323,217, Mar. 15, 1989, Pat. No. 5,084,178, which is a continuation of Ser. No. 206,676, Jun. 15, 1988, abandoned.

[51] Int. Cl.$^5$ .............................. B01D 29/56
[52] U.S. Cl. ..................... 210/335; 55/487; 55/521; 210/487; 210/489; 210/493.1; 210/493.5; 210/493.4
[58] Field of Search ............... 210/457, 493.1, 493.2, 210/493.4, 493.5, 483, 487, 489, 335; 55/486, 487, 521

[56] References Cited

U.S. PATENT DOCUMENTS

| | | | |
|---|---|---|---|
| 2,936,855 | 5/1960 | Allen et al. | 55/521 |
| 3,057,481 | 10/1962 | Pall | 210/493.1 |
| 3,165,473 | 1/1965 | Pall et al. | 210/510.1 |
| 3,174,625 | 3/1965 | Briggs | 210/493.1 |
| 3,189,179 | 6/1965 | McMichael | 210/238 |
| 3,280,935 | 10/1966 | Czerwonka | 210/493.1 |
| 3,306,794 | 2/1967 | Humbert, Jr. | 156/69 |
| 3,334,752 | 8/1967 | Matravers | 210/493.5 |
| 3,520,417 | 7/1970 | Durr et al. | 210/493.1 |
| 3,692,184 | 9/1972 | Miller et al. | 210/484 |
| 3,716,970 | 2/1973 | Stupf et al. | 55/521 |
| 3,827,566 | 8/1974 | Ponce | 210/338 |
| 3,871,851 | 3/1975 | Neumann | 55/521 |
| 4,033,881 | 7/1977 | Pall | 210/493.1 |
| 4,046,697 | 9/1977 | Briggs et al. | 210/493.1 |
| 4,089,783 | 5/1978 | Holyoak | 210/493.1 |
| 4,102,792 | 7/1978 | Harris | 210/493.1 |
| 4,154,688 | 5/1979 | Pall | 210/493.1 |
| 4,252,591 | 2/1981 | Rosenberg | 156/203 |
| 4,402,830 | 9/1983 | Pall | 210/457 |
| 4,410,427 | 10/1983 | Wydeven | 210/493.3 |
| 4,589,983 | 5/1986 | Wydeven | 210/493.3 |
| 4,665,050 | 5/1987 | Degen et al. | 502/462 |
| 4,735,720 | 4/1988 | Kersting | 210/493.5 |

FOREIGN PATENT DOCUMENTS

| | | | |
|---|---|---|---|
| 0001407 | 4/1979 | European Pat. Off. | 210/493.2 |
| 0083789 | 7/1983 | European Pat. Off. | 210/493.1 |
| 0347188 | 12/1989 | European Pat. Off. | 210/493.1 |
| 2034669 | 1/1972 | Fed. Rep. of Germany | 210/493.1 |
| 3219671 | 12/1983 | Fed. Rep. of Germany | 210/493.1 |
| 2490970 | 9/1981 | France | 210/493.1 |
| 723200 | 7/1951 | United Kingdom | 210/493.1 |
| 763917 | 1/1955 | United Kingdom | 210/493.1 |
| 1277588 | 6/1972 | United Kingdom | 210/493.5 |
| 1401231 | 7/1975 | United Kingdom | 210/502.1 |
| 2106001 | 4/1983 | United Kingdom | 210/498 |
| 2156232 | 10/1985 | United Kingdom | |
| 2192810 | 1/1988 | United Kingdom | 210/493.1 |
| 2214448 | 9/1989 | United Kingdom | 210/493.1 |

OTHER PUBLICATIONS

A series of drawings of "substrate media" with the description P14 (Reemay 2016) media @10.900 Slit Width With Hotmelt (Henkel 6300) Beads Hotmelt Bead Dia. .014 (Ref.) Hotmelt Bead Spacing .300 Centers, dated Jul. 14, 1987 and May 21, 1987.

A letter from Dr. Staffan Linnersten explaining the circumstances of the sales and the nature of the product which was not immediately apparent from the drawings listed above, dated Jun. 12, 1989.

Primary Examiner—Joseph W. Drodge
Attorney, Agent, or Firm—Leydig, Voit & Mayer

[57] ABSTRACT

A filter includes a pleated filter element having longitudinally extending pleats and a wrap member wrapped around the filter element. The wrap member is joined to the peaks of the pleats and has openings for increasing the dirt capacity of the filter. The filter element may be a composite of a filter layer, upstream and downstream support and drainage layers, a cushioning layer between the upstream support and drainage layer and the filter layer, and polymeric beads on the downstream side of the downstream support and drainage layer. An extruded polymeric mesh may comprise one or both of the upstream and downstream support and drainage layers.

37 Claims, 6 Drawing Sheets

5,252,207

WRAP MEMBER HAVING OPENINGS

CROSS-REFERENCE TO RELATED APPLICATIONS

This is a continuation-in-part of U.S. patent application Ser. No. 07/559,335 filed on Jul. 30, 1990 now abandoned, which is a continuation-in-part of U.S. patent application Ser. No. 07/323,217 filed on Mar. 15, 1989, now U.S. Pat. No. 5,084,178 which is a continuation of U.S. patent application Ser. No. 07/206,676 filed on Jun. 15, 1988, now abandoned.

TECHNICAL FIELD OF THE INVENTION

The present invention relates to a filter and more particularly to a corrugated filter for removing one or more substances from a fluid flowing through the filter. It also relates to a filter having a high dirt capacity and enhanced fatigue resistance.

BACKGROUND OF THE INVENTION

In filtration systems which have repeated or cyclical fluctuations in the flow rate across a filter, fatigue failure of the filter can be a problem. This is especially true for systems with wide flow excursions, e.g., from zero to full flow and back to zero, such as are experienced in filtration systems for piston-type pumps as used in fluid power systems. The flow cycles cause coincident cycles in the differential pressure across the filter, typically resulting in a "breathing type" flexure within the plated medium of the filter. If the pleated medium is a composite having a filter layer and a support and drainage layer, as the pleated medium flexes, the support and drainage layer can rub back and forth along the filter layer. Because the support and drainage layer is typically much more coarse than the filter layer, this rubbing may produce weak spots which can rupture in service. This type of failure is known as a fatigue failure.

Another problem of conventional filters is that they may have a low dirt capacity when the liquid flows through the filter element unevenly. For example, more liquid may flow through the upper portion of a filter element than through the lower portion. Consequently, more dirt is deposited on the upper portion of the filter element than on the lower portion. This uneven loading of the filter element can lower the dirt capacity of the filter element. The lower the dirt capacity of a filter element, the more often it is necessary to replace the filter, resulting in increased material and labor costs.

SUMMARY OF THE INVENTION

It is therefore an object of the present invention to provide a filter having good resistance to fatigue failures.

It is another object of the present invention to provide a filter having a high dirt capacity.

It is still another object of the present invention to provide a filter which is highly reliable and has an extended service life.

According to one aspect of the present invention, a filter may comprise a porous, pleated filter element having first and second ends and longitudinal pleat axis extending between the first and second ends. The pleated filter element includes a composite having first and second layers wherein the first layer includes a filter medium. Each pleat includes an open end, a bight end, and opposing sides which extend between the open end and the bight end. The filter further comprises several polymeric beads which extend along the second layer opposite the first layer and generally perpendicular to the pleat axis. Each bead extends from the open end of the pleat along the first side to the bight end and from the bight end along the second side to the open end. The portions of each bead which extend along the first and second sides of the pleat are joined to one another. Further, the filter comprises first and second end caps joined to the first and second ends of the pleated filter element.

A filter embodying this aspect of the invention provides more reliable service and a greater service life than many conventional filters. The second layer may be a downstream support and drainage layer. A support and drainage layer typically has greater mechanical strength or toughness than the filter layer, which is frequently delicate because, for example, of its high degree of porosity. Consequently, by disposing the polymeric beads on the surface of the downstream support and drainage layer rather than directly on the filter layer, the filter layer is protected from tearing or excessive distortion when the filter element is corrugated or used to filter fluids. Furthermore, by joining the opposing portions of each bead within the pleats, flow channels are defined within each pleat. These flow channels are maintained relatively open by the joined portions of the beads even when the filter is subjected to high pressure liquids or pulsating flow.

According to another aspect of the present invention, a pleated filter element may comprise a filter layer, a support and drainage layer, and a cushioning layer. The support and drainage layer is disposed along one side of the filter layer. The cushioning layer is positioned between the support and drainage layer and the filter layer and includes a material which is smoother than the support and drainage layer.

According to a further aspect of the present invention, a filter element may comprise a pleated composite having a filter layer and a support and drainage layer. In addition, the composite has a material position between the filter layer and the support and drainage layer for minimizing abrasion of the filter layer by the support and drainage layer.

A filter element embodying these aspects of the present invention is particularly reliable. The cushioning layer or material between the filter layer and the support and drainage layer prevents the support and drainage layer from abrading the filter layer and producing a weak spot in the filter layer. Consequently, a filter embodying the present invention resists fatigue failures far better than conventional filters.

According to yet another aspect of the present invention, a filter may comprise a pleated filter element and a wrap member. The pleated filter element has longitudinally extending pleats having peaks. The wrap member is wrapped around the filter element, is joined to the peaks of the pleats, and has openings, thereby increasing the dirt capacity of the filter element. The total area of the openings is less than one half of the total area of the surface defined by the peaks of the pleats.

A filter element embodying this aspect of the invention not only has an increased dirt capacity, but it also has superior fatigue failure resistance, especially when used in systems with large, frequent changes in flow rates. By wrapping the pleats with the wrap member, movement of the pleats is restrained and abrasion of the filter medium is thereby prevented. In addition, the wrap member produces a more uniform flow distribution over the length of the filter. Consequently, dirt is more evenly deposited on the filter element, increasing the useful life of the filter. The wrap member also helps the filter to resist radially outwardly direct forces and can prevent the filter element from swelling outward.

According to an additional aspect of the invention, a filter element may comprise a pleated composite which includes two extruded polymeric mesh layers and a filtering layer positioned between them.

According to another aspect of the invention, a filter element may comprise a pleated composite and a wrap which is wrapped around the pleated composite. The pleated composite includes an extruded polymeric mesh layer and a filtering layer.

Filter elements embodying these aspects of the invention are easy to manufacture and highly effective. With the extruded polymeric mesh layers forming part of the pleated composite, the pleated composite can easily be fabricated and corrugated.

DESCRIPTION OF THE PREFERRED EMBODIMENTS

Figure 1:
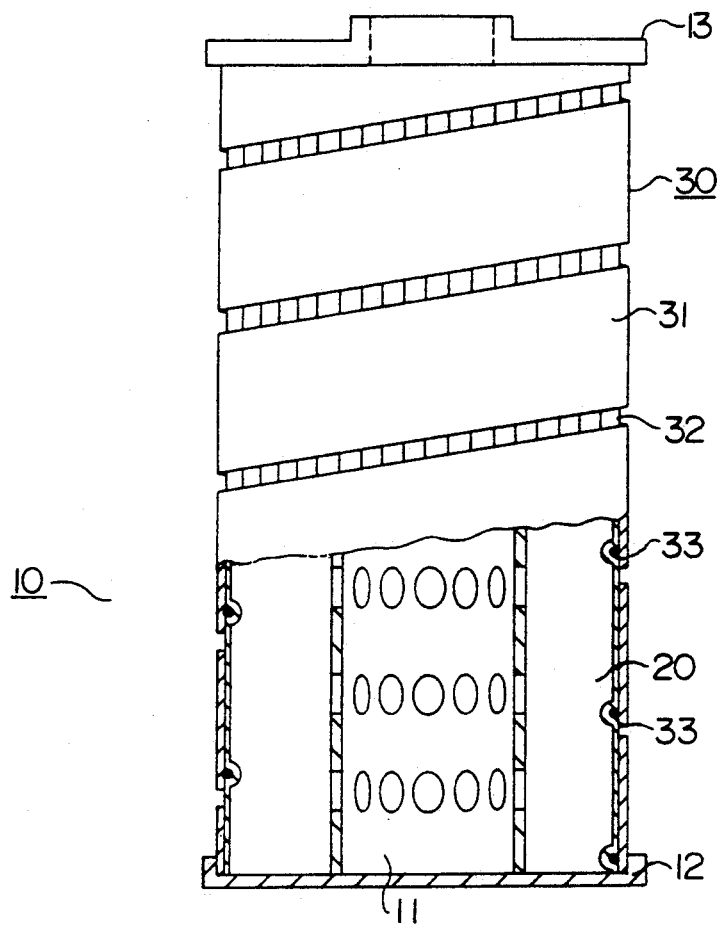
FIG. 1 is a partially cut-away elevation of an embodiment of a filter equipped with a wrap member according to the present invention.
Figure 2:
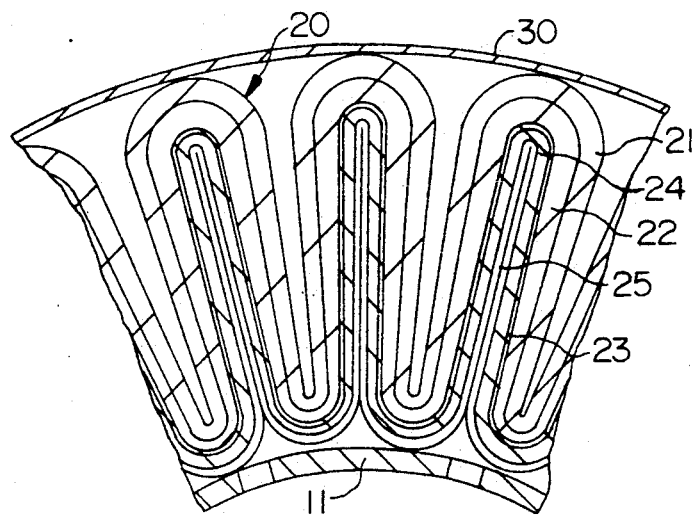
FIG. 2 is a transverse cross-sectional view of a sector of the embodiment of FIG. 2.

A number of preferred embodiments of a filter according to the present invention will now be described while referring to the accompanying drawings. FIG. 1 is a perspective view of a first embodiment equipped with a spiral wrap member, and FIG. 2 is a transverse cross-sectional view of a sector of the embodiment of FIG. 1. As shown in FIG. 1, the filter 10 of this embodiment has a hollow pleated filter element 20 with longitudinal pleats. A hollow, rigid tubular core 11 may be disposed inside the hollow center of the filter element 20 to give the filter element 20 sufficient strength to resist the inwardly directed forces which act on the filter element 20. The core 11 can be made of any sufficiently strong material which is compatible with the fluid to be filtered. For example, the illustrated core 11 is made of a perforated metal, but, alternatively, it can be made of a polymeric material.

A blind end cap 12 and an open end cap 13 may be fitted over the two ends of the filter element 20 to direct the fluid through the filter element 20. Alternatively, both end caps can be open or can include connectors to link a stack of filter elements. The end caps 12 and 13 may be fashioned from any suitably impervious material, such as a metallic or polymeric material, which is compatible with the fluid to be filtered. The end caps 12 and 13 may be secured to the ends of the filter element 20 by any suitable means, including a bonding agent such as an adhesive or a potting compound. Alternatively, the end caps 12 and 13 may be melt-bonded to the ends of the filter element 20 or joined by means of spin bonding or sonic welding. The ends of the hollow core 11 may be secured to the two end caps 12 and 13 by similar means.

The filter element 20 itself can be configured in a variety of ways without departing from the scope of the invention. For example, the filter element can have an upstream support and drainage layer, a filter layer, and a downstream support and drainage layer. However, the present inventors found that the fatigue resistance of a filter element can be greatly increased by the provision of a cushioning layer between the filter layer and either or both of the support and drainage layers. FIG. 2 illustrates an example of such a filter element 20. It has a multi-layer, composite construction including an upstream support and drainage layer 21, a cushioning layer 22, a filter layer 23, and a downstream support and drainage layer 24. The exemplary filter element illustrated in FIG. 2 also includes polymeric beads 25 disposed on the downstream surface of the downstream support and drainage layer 24.

The support and drainage layers are preferably very open, allowing fluid to flow laterally and to uniformly distribute the fluid across the surface of the filter layer. Thus, the support and drainage layers typically have a very low edgewise flow resistance. The support and drainage layers also prevent the pleated surfaces of the filter layer 23 from coming into contact with one another and thereby reducing the effective surface area of the filter layer 23. The support and drainage layers do so by providing a positive spacing (fanning) between adjacent pleats of the filter layer.

Any suitable woven or nonwoven material having good porosity can be used for the upstream support and drainage layer 21 as well as the downstream support and drainage layer 24. Furthermore, either layer may be fabricated from one or more of natural fibers, polymeric materials, and glass. In a preferred embodiment, the upstream support and drainage layer 21 comprises an extruded polymeric mesh. The mesh can be fabricated from any polymeric material, including polyester, polypropylene, or polyamide such as nylon, which is suitable for the fluid being filtered and for the applicable filtration parameters such as temperature. For example, polypropylene might be preferable to nylon for filtering hot water. The thickness of the mesh is preferably in the range from about 0.010 to about 0.025 of an inch but may be less than 0.010 of an inch or more than 0.025 of an inch. The number of strands per inch is preferably in the range from about 10 to about 30 in each linear dimension but may be less than 10 or more than 30. For example, the mesh may have up to 80 or more strands per inch in each linear dimension. The mesh is preferably as smooth as possible to reduce abrasion between it and the underlying layers. Extruded polymeric mesh is generally preferable to other support and drainage materials, including woven and nonwoven fibrous webs and polymeric netting, because it is so smooth and because it typically does not shrink during fabrication and corrugation of the filter element. An extruded polymeric mesh available from Nalle Corporation is particularly smooth. For example, it has no significant irregularities such as knobs, at the intersections of the strands of the mesh which might otherwise abrade the filter layer. A nylon mesh available from Nalle Corporation under the trade designation NIF020S 13×13, where 020 indicates the thickness in thousandths of an inch and 13×13, indicates the number of strands per linear inch in the x and y directions, is especially preferred. Another example of a suitable material for the upstream support and drainage layer is a nylon sheathed polyester nonwoven material sold by BASF of Williamsburg, Va. under the trade designation Colback 50. However, a Nalle extruded mesh is preferable to Colback 50 because it is less abrasive and results in a significantly higher dirt capacity.

A principal purpose of the cushioning layer 22 is to prevent abrasion between the support and drainage layer and the filter layer. The support and drainage layer typically has good drainage properties because it is fashioned from relatively large fibers or filaments. Consequently, it generally has a rougher surface than the filter layer. When such a material is laminated directly to the filter layer 23, significant abrasion of the filter layer 23 results when the filter element 20 undergoes flexing, for example, due to pressure cycles, and the support and drainage layer repeatedly rubs against the filter layer. However, when a cushioning layer 22 which is smoother than the upstream drainage layer is interposed between the support and drainage layer and the filter layer 23, the abrasion of the filter layer 23 can be greatly reduced, resulting in an increase in the useful life of the filter element 20.

The cushioning layer 22 is preferably formed of a thin, very porous material. For example, the cushioning layer preferably has a thickness of less than 100 microns. It is also preferably formed from a material which can be characterized as smooth or as smooth and tough. For example, it may be a non-abrasive, nonwoven material with a high tensile strength. A preferred material for the cushioning layer 22 is a wet-laid polyester nonwoven material sold by Hirose Corporation under the trade designation 05TH08. Other preferred materials include a nylon nonwoven material available from Fiberweb North America Inc. under the trade designation Cerex and a nonwoven polyester material available from Reemay Corporation under the trade designation Reemay, such as Reemay 2006 or Reemay 2250. Of these materials, the materials from Hirose and Reemay are most preferred. However, any suitable woven or nonwoven material which is smoother (less abrasive) than the upstream drainage layer 21 may be used.

The filter layer 23 may be selected in accordance with several factors, including the nature of the fluid being filtered, the nature and size of the contaminants in the fluid, and the acceptable pressure drop across the filter element 20. The filter layer 23 may be any suitable filter medium. For example, the filter medium may be fashioned as a membrane or a woven or nonwoven fibrous sheet and may be fabricated from a natural or synthetic polymer or glass. Thus, the filter medium may comprise a nonwoven sheet principally including cellulose fibers or essentially consisting of glass fibers with a resin binder. Furthermore, the filter medium may have any desired pore structure, including a graded pore structure, and any desired rated pore size. However, the rated pore size of the filter layer 23 is preferably less than the rated pore size of the upstream or downstream support and drainage layers. In a preferred embodiment, the filter layer 23 comprises a suitable grade of a glass fiber acrylic bonded medium with an integral substrate providing additional strength. Preferred media, including a family of fibrous filter media having various binder resins, are available from Pall Corporation under the trade names Ultipor and Pallflex.

The downstream support and drainage layer 24 typically has greater mechanical strength than the filter layer 23 and therefore serves to protect the more delicate filter layer 23 from tearing or distortion during corrugation or use. One example of a suitable material for use as the downstream drainage layer 24 is a paper available from Dexter Company under the trade designation T-244.

As shown in FIG. 2, the filter element 20 may include polymeric beads 25 formed on the downstream surface of the downstream support and drainage layer 24 on each of the pleats 26 of the filter element 20. Within each pleat 26, the beads 25 are joined to themselves and serve as spacers to define flow channels 27 within the pleat 26 and ensure proper fluid flow through the pleat 26. It is also possible to provide polymeric beads 25 on the upstream side of the filter layer 23 as well as on the downstream side.

The polymeric beads 25 may be formed from a variety of materials including many thermoplastic or thermosetting materials. Thus, the polymeric beads 25 may be formed from a material comprising a polyester, polyamide, or polyolefin resin. Furthermore, the polymeric beads 25 may be applied in parallel strips along the downstream surface of the downstream support and drainage layer 24 in any suitable manner. For example, the polymeric beads 25 may be formed from a hot melt adhesive and applied continuously from an evenly spaced multi-orifice dispensing head with the downstream support and drainage layer 24 moving under the dispensing head, preferably at a constant velocity, producing several continuous, parallel beads. The hot melt adhesive may be applied to the downstream support and drainage layer 24 either before or after filter element 20 has been formed into a composite.

In a modification of this method, the hot melt adhesive may be applied intermittently from the dispensing head or from an unevenly spaced multi-orifice dispensing head to produce several discontinuous, parallel beads or several unevenly spaced parallel beads. In other alternatives, a granular polymeric material may be applied by extrusion from a multi-orifice extrusion head; a plastisol polyurethane may be applied from a multi-orifice dispenser and then cured with an in-line heating device; or a solvent based adhesive or potting compound may be applied from a multi-orifice dispenser and the solvent may then be flashed by a heating/ventilation device.

As applied to a support and drainage layer 24, the bead material preferably has a surface tension high enough to prevent excessive wetting of the support and drainage layer 24 or wicking through the support and drainage layer 24 but not so high as to prevent adhesion between the beads 25 and the support and drainage layer 24. This minimizes flow restriction through the exemplary filter element since the surface of the support and drainage layer 24 which is in contact with the beads 25 is effectively blocked. The contact angle between the beads 25 and the downstream drainage layer 24, as measured by the Sessile method, may preferably be in the range from about 100° to about 120°.

Various cross-sectional shapes of the beads 25 are suitable. The most preferred shape has a needle-like cross section. This shape minimizes the contact area between the bead 25 and the support and drainage layer 24. However, this shape is difficult to produce at reasonable production rates. For large scale production, a generally circular cross section is preferred. Other suitable shapes include triangular, diamond, square, and rectangular cross sections.

The size of each bead 25 and the spacing between the beads 25 may vary without departing from the scope of the invention. The size of the beads 25 is determined by the size of the orifice in the dispensing head, the relative velocity between the dispensing head and the downstream drainage layer 24, and the viscosity of the bead material. For many applications, the diameter of the beads may preferably be in the range from about 4 to about 20 mils.

The spacing between beads 25 is preferably selected so that the stress deformation, i.e., deflection, of the pleated composite satisfies both of the following conditions: (1) the elastic limit of the filter medium comprising the filter layer 23, i.e., the maximum unit of stress beyond which the filter medium will not return to its original shape, is not exceeded and (2) the deflection of the composite during normal operation does not increase the flow resistance in the flow channels 27 more than 10 percent. For many applications, the spacing between evenly spaced beads 25 is preferably such that about 5 to about 20 beads per inch or, more preferably, about 8 to about 15 beads per inch are applied to the downstream drainage layer 24.

Once the beads 25 have been applied to the downstream support and drainage layer 24, then the upstream support and drainage layer 21, the cushioning layer 22, the filter layer 23, and the downstream support and drainage layer 24 with the beads 25 are fed into a corrugator, such as a Chandler "grab and fold" type corrugator or a Rabofsky "cam actuated blade" type corrugator. The various layers of the filter element may be formed into a composite before being fed into the corrugator, or layers including the downstream support and drainage layer 24 with the beads 25 may be fed individually into the corrugator, which then forms the composite at the same time it forms the pleats 26 in the filter arrangement 10. It is typically preferable to preheat the extruded polymeric mesh before it enters the corrugator so it will set well after the composite has been corrugated.

Figure 3:
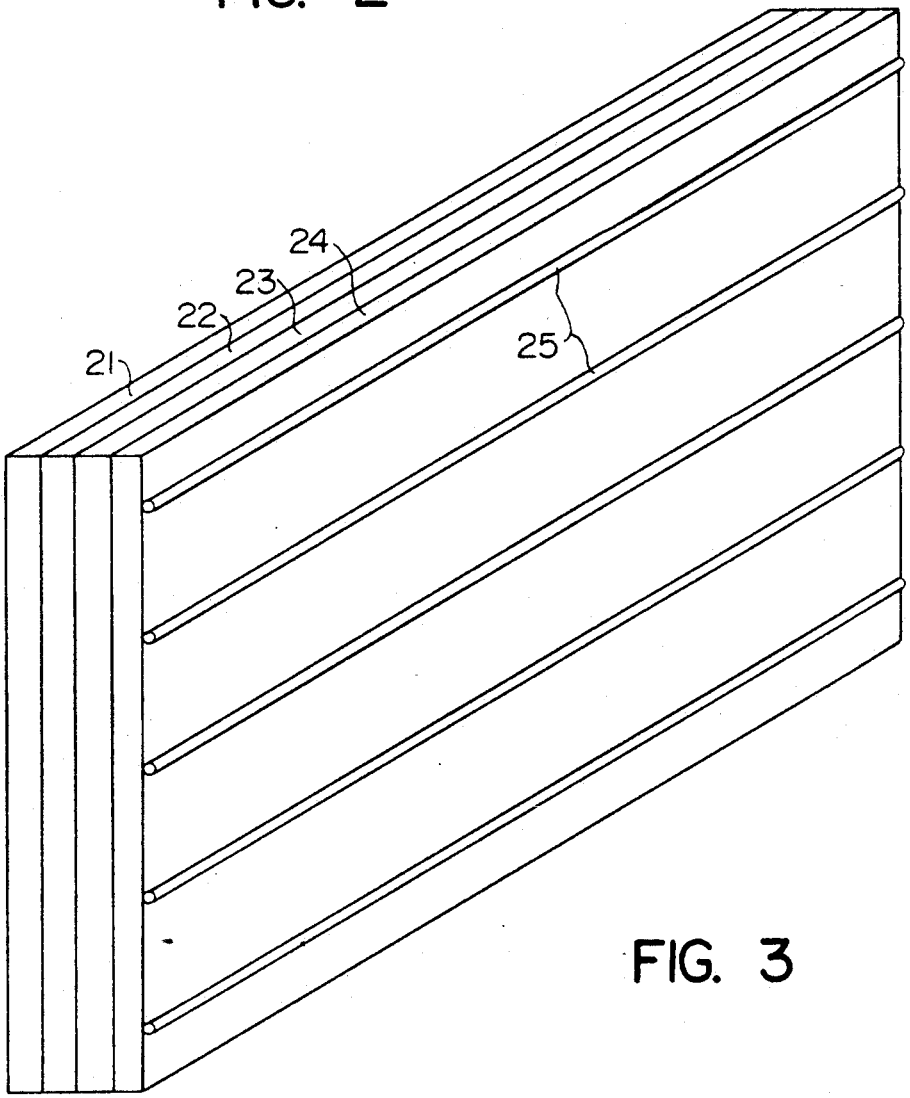
FIG. 3 is a perspective view of a filter element for use in the present invention prior to corrugation.
Figure 4:
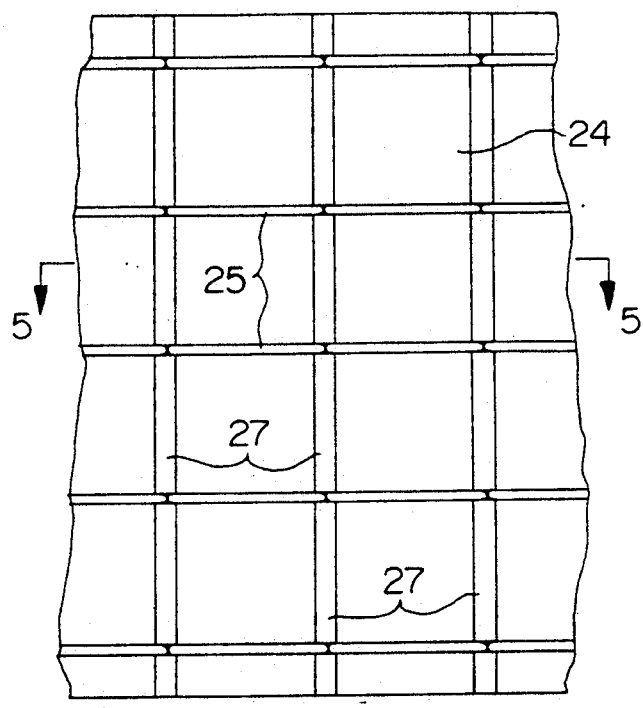
FIG. 4 is an elevation of a portion of the filter element of FIG. 3 after corrugation as viewed from the downstream side of the element.
Figure 5:
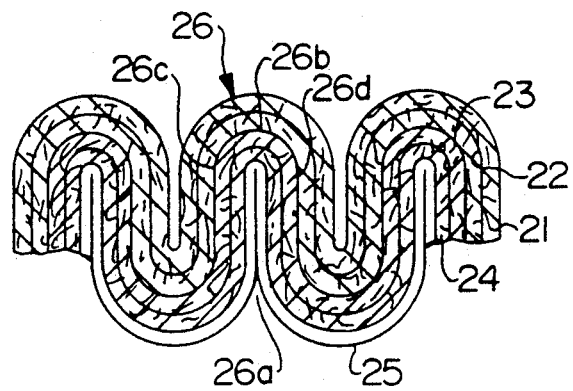
FIG. 5 is a cross-sectional view of the filter element of FIG. 4 taken along Line V—V of FIG. 4.

FIG. 3 is a perspective view of an example of a composite filter element 20 prior to corrugation, FIG. 4 is an elevation of a portion of the filter element 20 after corrugation, and FIG. 5 is a transverse cross-sectional view taken along Line V—V of FIG. 4 of a portion of the corrugated filter element 20. As shown in FIGS. 4 and 5, each pleat 26 extends generally perpendicularly to the beads 25 and includes an open end 26a, a bight end 26b, and first and second opposing sides 26c, 26d. The portions of each bead 25 which extend along the opposing sides 26c, 26d of each pleat 26 are joined to one another, defining flow channels 27 within each pleat 26 between adjacent beads 25 and the opposing sides 26c, 26d. Because the downstream support and drainage layer 24 and beads 25 are preferably positioned on the downstream surface of the filter layer 23 to resist the pressure drop across the filter 10 during normal operation, the flow channels 27 are preferably drainage channels.

Care should be taken in the alignment of the support and drainage layer 24 within the corrugator to ensure that the beads 25 oppose themselves in the pleats 26 so the opposing portions of the beads 25 can be joined. If the beads 25 are formed from a hot melt adhesive, heated panels in the corrugator may be used to tack the beads together. Beads comprising other types of materials may require coating by an adhesive or softening by a solvent for this purpose. After the filter element 20 has been corrugated, it may be desirable to set the tacked beads in a forced convection oven. It may also be desirable to cure any binders in the filter medium of the filter layer 23 at the same time the beads 25 are being set. Alternatively, the beads 25 may be set and the filter medium may be cured in a tunnel oven during a continuous production process. Of course, the setting of the beads 25 and the curing of the filter medium should be done at temperatures which are not deleterious to the other components of the filter. Furthermore, all of the cured components of the filter element should be compatible with the fluid to be filtered.

In corrugating the filter element 20 and setting the beads 25, each bead 25 in the pleat 26 is preferably joined to itself the entire distance from the bight end 26b to the open end 26a of the pleat 26. Furthermore, the radius at the bight end 26b of the pleat 26 is preferably as small as possible, and preferably zero, to maximize resistance to fatigue failure which may result from flexure of the filter element 20 during pulsating flow conditions. However, the beads 25 must not be over-compressed, since over-compression would cause excessive blinding of the filter element 20 and would reduce the cross-sectional area of the flow channel 27. Thus, when corrugating the filter element 20, it may be desirable to secure the filter element 20 in a spring-loaded fixture with positive stops to prevent over-compression and a slight reverse-curve to ensure the minimum radius at the bight end 26b of the pleat 26.

By joining the opposing portions of each bead 25, the flow channels 27 within each pleat 26 remain relatively open even when the filter 10 is used to filter a pulsating flow at high differential pressures. Thus, a filter element according to the present invention has a greater resistance to flow fatigue and therefore provides more reliable service and a greater service life than many conventional filters.

Alternatively, the downstream support and drainage layer may comprise an extruded polymeric mesh such as that described with respect to the upstream support and drainage layer. For example, the downstream support and drainage layer may be an extruded mesh available from Nalle Corporation, such as the extruded nylon mesh available under the trade designation NIF020S 13×13.

If the extruded mesh is sufficiently smooth, it may be preferable not to include a cushioning layer between the filtering layer and the downstream extruded mesh layer. Alternatively, a cushioning layer may be positioned between the filtering layer and the downstream mesh. The characteristics of the cushioning layer between the filtering layer and the downstream mesh are very similar to those of the cushioning layer between the filtering layer and the upstream mesh. However, the downstream cushioning layer also preferably has sufficient strength to withstand the forces associated with the pressure drop across the filtering layer. The preferred materials listed for the upstream cushioning layer are also the preferred materials for the downstream cushioning layer.

A number of preferred examples of composite pleated filter elements are listed below.

| Element A | |
|---|---|
| Upstream s/d layer | Nalle extruded mesh (NIF.013-13-13) |
| Cushioning layer | Hirose wet-laid polyester nonwoven (05TH08) |
| Filter layer | Pall Ultipor medium (suitable grade) |
| Downstream s/d layer | Dexter Company T-244 |
| Polymeric bead spacers | Hot-melt adhesive |
| Element B | |
| Upstream s/d layer | Nalle extruded mesh (NIF020S 13 × 13) |
| Cushioning layer | Reemay 2006 nonwoven polyester |
| Filter layer | Pall Ultipor medium (suitable grade) |
| Cushioning layer | Cerex nylon nonwoven (suitable grade) |
| Downstream s/d layer | Nalle extruded mesh (NIF020S 13 × 13) |
| Element C | |
| Upstream s/d layer | Nalle extruded mesh (NIF.013-13-13) |
| Cushioning layer | Cerex nylon nonwoven (.4 oz/sq. yard) |
| Filter layer | Pall Ultipor medium (suitable grade) |
| Downstream s/d layer | Dexter Company T-244 |
| Polymeric bead spacers | Hot-melt adhesive |
| Element D | |
| Upstream s/d layer | Colback 50 |
| Cushioning layer | Hirose wet-laid polyester nonwoven (05TH08) |
| Filter layer | Pall Ultipor medium (suitable grade) |
| Downstream s/d layer | Dexter Company T-244 |
| Polymeric bead spacers | Hot-melt adhesive |
| Element E | |
| Upstream s/d layer | Colback 50 |
| Cushioning layer | Cerex nylon nonwoven (.4 oz/sq. yard) |
| Filter layer | Pall Ultipor medium (suitable grade) |
| Downstream s/d layer | Dexter Company T-244 |
| Polymeric bead spacers | Hot-melt adhesive |

Of these five examples, Elements A and B are the most preferred partly because the Nalle mesh has greater dirt capacity than Colback 50.

One of the major limiting factors on the life of a filter is the dirt capacity of the filter element of the filter. When the filter element becomes loaded with dirt, it is usually necessary to replace the filter. Frequent replacement of a filter is uneconomical due to both the cost of the filter and the cost of the labor involved in its replacement.

The present inventors discovered that if a pleated filter element is enveloped in a wrap member having openings, the dirt capacity of the filter element can be greatly increased compared to that of an unwrapped pleated filter element or compared to that of a pleated filter element completely enveloped in a wrap member.

There may be several reasons why the dirt capacity is increased. The wrap member may help to maintain the spacing between adjacent pleats of the filter element. For example, in a clean, unwrapped filter, a flow drag force on the apexes of the pleats can cause some of the adjacent pleats to pinch together. This reduces the effective surface area and therefore the useful life of the filter. By providing the filter with a wrap member which is joined to the peaks of the pleated filter element, adjacent pleats are restrained from pinching together. By providing the wrap member in combination with the polymeric bead spacers, the pleats are restrained even further. Therefore, the effective surface area of the filter is maximized and the useful life is significantly increased.

A wrap member also restrains movement of the pleats of a filter element when subjected to cyclic pressure fluctuations. As a result, abrasion caused by movement of the pleats is decreased, and the life span of the filter element is further increased.

In addition, the wrap member may produce a more uniform flow distribution over the length of the filter. In an unwrapped filter, flow through the filter element can be uneven. For example, when a filter element is enclosed in a housing, flow through the filter element may be greatest in the area closest to the inlet of the filter housing. Uneven flow causes dirt to be unevenly deposited on the filter element, and the uneven distribution can reduce the useful life of the filter. By providing the filter with a wrap member having openings, the flow can be distributed more evenly along the filter element, increasing the useful life of the filter.

The results produced by a wrap member are striking. For example, a filter element wound with a wrap member according to the present invention is expected to have a dirt capacity about 10% to 20% higher than the dirt capacity of a similar unwrapped filter element.

The wrap member also helps a filter element to resist radially outwardly directed forces and can prevent the filter element from swelling outward during pressure fluctuations in which the filter element is momentarily subjected to a negative differential pressure.

FIG. 1 illustrates an example of the use of a wrap member with a filter according to the present invention. In the embodiment of FIG. 1, the filter 10 is equipped with a wrap member 30 wrapped around the filter element 20 and having openings formed therein for the passage of fluid. In this embodiment, the wrap member 30 is a parallel-sided strip 31 of flexible material which is spirally wrapped about the filter element 20 in a plurality of turns. The spiral turns have a pitch greater than the width of the strip 31 so the openings in the wrap member comprise a spiral gap 32 between adjacent turns. It can be seen from FIG. 1 that the openings are unobstructed. The spiral strip 31 may be made of any suitable material which is compatible with the fluid the being filtered. Since much of the fluid being filtered reaches the filter element through the openings in the wrap member, the wrap member need not be permeable to the fluid, although in a preferred embodiment it is permeable. For many applications, a porous, polymeric, nonwoven material available from Reemay Corporation under the trade designation Reemay is suitable. Laminates of the Reemay material can also be employed. Examples of other suitable materials are oil board paper and mylar film. The material can be selected in accordance with the desired reverse flow strength of the filter element.

The spiral strip 31 can be secured to the outer surface of the filter element 20 by any suitable means. One means of attaching the spiral strip 31 to the filter element 20 is by a bonding agent, such as a hot melt adhesive, which is applied to the strip 31 as it is wound around the filter element 20. The bonding agent 33 can be applied to the strip 31 in the form of a continuous or intermittent bead which spirals around the filter element 20 parallel to the edges of the strip 31. Alternatively, the strip 31 may be fusion bonded to the filter element 20 by a hot wheel which travels down the filter as the filter rotates.

The openings of the wrap member are preferably distributed uniformly along the filter element 20, although a nonuniform distribution may be used. To prevent the wrap member from becoming loaded, the size of the openings should be large enough to allow the passage of virtually all of the particles contained in the fluid being filtered. Furthermore, the total area of the openings is generally less than 50% of the total surface area of the surface defined by the peaks of the pleats, e.g., the cylinder circumscribing the peaks of the pleats of the illustrated filter element. More preferably the total area of the openings is in the range from about 6% to about 30% of the total area of the surface defined by the peaks of the pleats. For example, in one embodiment, the filter element has a $4\frac{1}{2}$" outer diameter and an $8\frac{3}{4}$" length, the spiral strip 31 has a $1\frac{1}{2}$" width, and the spiral gap 32 between adjacent turns has a $\frac{1}{2}$" width.

The filter 10 of FIG. 1 can be manufactured in any suitable manner. For example, a composite filter element 20 having a standard axial length (typically 42") can be formed using a corrugator in substantially the same manner as described previously. The core 11 is then inserted into the filter element 20 and the assembly is mounted on a mandrel. While the filter element is rotated on the mandrel, a spiral strip 31 is wrapped around the filter element 20 so as to leave a gap 32 of a desired size between turns. As the strip 31 is wrapped around the filter element 20, a hot melt adhesive 33 is applied to the inner surface of either the strip 31, the outer surface of the filter element 20, or both to bond the strip 31 to the filter element 20. Alternatively, a hot wheel may be run along an edge of the strip to fuse the strip to the peaks of the pleats. The wrapped filter element 20 is then cut to a suitable length and the end caps 12 and 13 are fitted over the ends of the filter element 20 and the spiral strip 31. The flanges of the end caps 12 and 13 fit over the ends of the spiral strip 31 and prevent it from unwinding.

Figure 6:
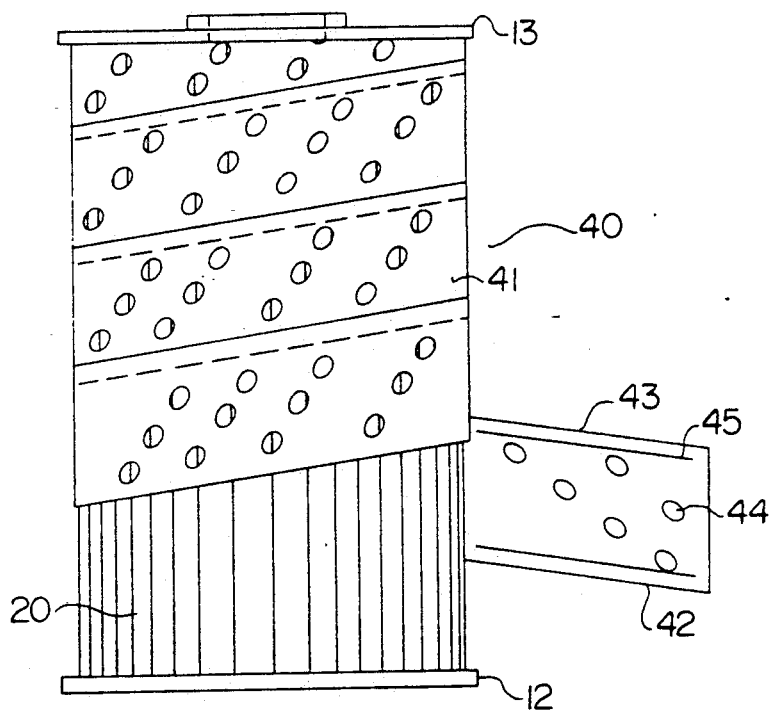
FIG. 6 is an elevation of another embodiment of a filter according to the present invention with the wrap member partially removed.

FIG. 6 illustrates another embodiment of the present invention. The embodiment has a wrap member 40 in the form of a spiral strip 41 having openings in the form of perforations 44 formed in the strip 41 itself. These perforations 44 serve the same function as the spiral gap 32 of the embodiment of FIG. 1 and increase the dirt capacity of the filter element 20. The perforations 44 are preferably formed in the spiral strip 41 prior to its being wrapped around the filter element 20, since punching the perforations 44 in the strip 41 after wrapping could damage the filter element 20. The adjacent turns of the perforated spiral strip 41 can be separated from one another by a spiral gap, as in the embodiment of FIG. 1, so the openings comprise both the perforations and the spiral gap. However, the wrap member 40 may have greater strength if the edges of adjacent turns partially overlap one another, as shown in FIG. 6. The spiral strip 41 has a first edge 42 and a second edge 43. The first edge 42 may be bonded directly to the filter element 20 with a bonding agent 45, while the second edge 42 may overlap and be bonded to the first edge 43 of the adjacent turn of the strip 41. The structure of this embodiment is otherwise substantially the same as that of the embodiment of FIG. 1.

Figure 7:
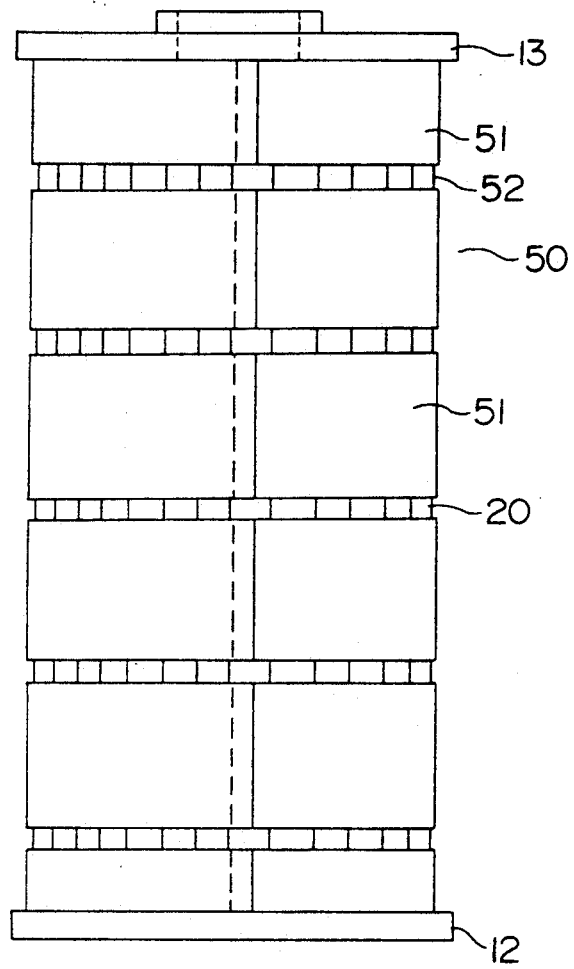
FIG. 7 is an elevation of another embodiment of a filter according to the present invention.

The wrap member need not be wrapped spirally around the filter element 20. FIG. 7 is an elevation of another embodiment of the present invention having a wrap member comprising a plurality of strips 51 of a flexible material which are wrapped circumferentially around the filter element 20 in a plurality of parallel turns. Adjacent turns of the strips 51 are separated from one another by circumferentially-extending gaps 52 which comprise the openings. The ends of each strip 51 overlap and are bonded to one another, and the strips 51 can also be attached to the filter element 20 by bonding. The circumferentially-extending gaps 52 of this embodiment function in the same manner as the spiral gap 32 of FIG. 1 and increase the dirt capacity of the filter element 20. Although a wrap member 50 with circumferentially extending strips 51 is effective for increasing the dirt capacity of the filter, such a filter is more complicated to manufacture than a filter having a spiral wrap member, and therefore a filter with a spiral wrap member is generally more economical than one of the type illustrated in FIG. 7.

Figure 8:
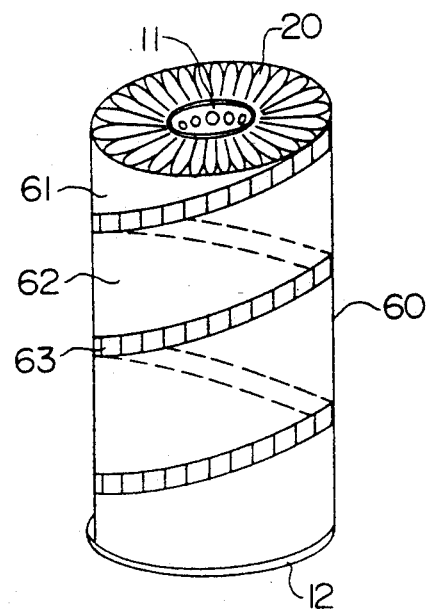
FIG. 8 is a perspective view of another embodiment of a filter according to the present invention.

The embodiments of FIGS. 1 and 6 employ only a single spiral strip to form the wrap member. FIG. 8 illustrates another embodiment of the present invention which differs from the embodiment of FIG. 1 in that it has a wrap member 60 which comprises two strips 61 and 62 which are spirally wound around the filter element 20 in parallel, with each strip forming a plurality of turns. The strips are separated by spiral gaps 63 which comprise the openings 61. The structure of this embodiment is otherwise the same as that of the embodiment of FIG. 1. There is no limit on the number of strips which constitute the spiral wrap.

Figure 9:
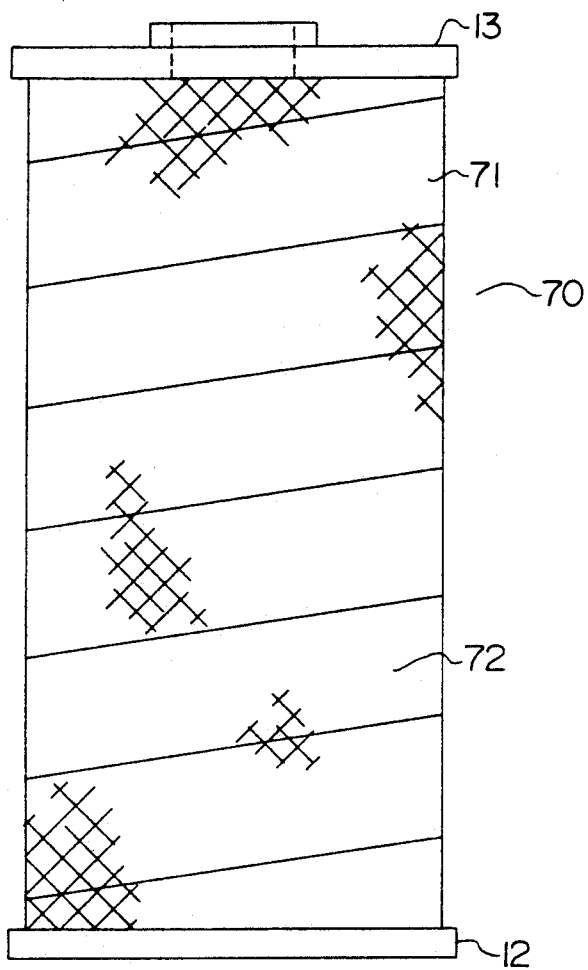
FIG. 9 is an elevation of another embodiment of a filter according to the present invention.

FIG. 9 illustrates another embodiment of the present invention having a wrap member 70 in the form of a strip 71 of mesh which is wrapped spirally around a filter element. In this embodiment, the openings in the wrap member 70 are constituted by the mesh openings 72. The size of the mesh will depend upon the properties of the fluid being filtered, the flow rate, and other factors, but a mesh with a mesh size of about 30 counts per inch is generally satisfactory. The material which is used for the mesh will depend on the type of fluid being treated. Examples of suitable types of mesh are a knitted sock or a polymeric mesh. A polymeric mesh has the advantage that it can be directly connected to the filter element 20 by fusion bonding without the need for an adhesive. The structure of this embodiment is otherwise the same as that of the embodiment of FIG. 1.

In the exemplary embodiments, the filter element is intended for use with outside-in radial fluid flow. However, if the positions of the upstream and downstream support and drainage layers 21 and 24, the cushioning layer 22, and the polymeric beads 25 with respect to the filter layer 23 are switched, the filter element can be used for inside-out radial flow. In a filter element for inside-out radial flow according to the present invention, the upstream support and drainage layer would extend along the inner surface of the filter layer 23 (the surface closest to the radial center of the filter), the cushioning layer would be positioned between the upstream support and drainage layer and the filter layer, and the downstream support and drainage layer would extend along the outer surface of the filter layer 23 with the polymeric beads 25 adhered to the outer surface of the downstream support and drainage layer rather than to the inner surface.

Although the present invention has been described in terms of exemplary embodiments and examples, it is not limited to those embodiments or examples. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

What is claimed is:

1. A filter comprising:
   a pleated filter element having a longitudinal axis and including longitudinally extending pleats having peaks; and
   a wrap member comprising one or more strips wrapped around the filter element at least once and joined to the peaks of the peats so as to restrain movement of the pleats and having unobstructed openings for increasing the dirt capacity of the filter element, the openings having a total area less than about one-half of the total area of a circumscribing surface defined by the peaks of the pleats.

2. A filter as claimed in claim 1 wherein the wrap member comprises a strip of material spirally wrapped around the filter element in a plurality of turns and the openings comprise a spiral gap between adjacent turns.

3. A filter as claimed in claim 1 wherein the wrap member comprises a strip of material spirally wrapped around the filter element and the openings comprise holes formed in the strip of material.

4. A filter as claimed in claim 3 wherein the strip is wound around the filter in a plurality of turns and the edges of adjoining turns overlap one another.

5. A filter as claimed in claim 3 wherein the strip is wound around the filter in a plurality of turns and the openings further comprise a spiral gap between adjacent turns.

6. A filter as claimed in claim 1 wherein the wrap member comprises a plurality of strips of material wound around the filter element in the circumferential direction and wherein the openings comprise a circumferential gap between adjacent strips.

7. A filter as claimed in claim 1 wherein the pleated element has a generally cylindrical configuration and longitudinal pleats.

8. A filter as claimed in claim 1 wherein the wrap member comprises a plurality of strips of material wound spirally around the filter element and wherein the openings comprise spiral gaps between adjacent strips.

9. A filter as claimed in claim 1 wherein the wrap member comprises a mesh which is spirally wrapped around the filter element.

10. A filter as claimed in claim 1 wherein the wrap member comprises a porous material.

11. A filter as claimed in claim 1 wherein the area of the openings in the wrap member is in the range from approximately 6% to approximately 30% of the surface defined by the peaks of the pleats.

12. A filter as claimed in claim 1 wherein the filter element comprises a composite including a filter layer, a support and drainage layer on the upstream side of the filter layer, and polymeric bead spacers on the downstream surfaces of the pleats.

13. A filter as claimed in claim 12 further comprising a cushioning layer disposed between the upstream support and drainage layer and the filter layer and comprising a material which is smoother than the upstream support and drainage layer.

14. A filter as claimed in claim 1 wherein the filter element comprises a composite including a filter layer, support and drainage layer on the upstream side of the filter layer, a cushioning layer disposed between the upstream support and drainage layer and the filter layer and comprising a material which is smoother than the upstream support and drainage layer, a support and drainage layer on the downstream side of the filter layer, and polymeric bead spacers on the downstream surface of the downstream support and drainage layer.

15. A filter as claimed in claim 1 wherein the filter element comprises a pleated composite including an extruded polymeric mesh layer and a filtering layer.

16. A filter element as claimed in claim 15 wherein the mesh layer is in the range from about 0.010 to about 0.025 of an inch thick.

17. A filter element as claimed in claim 15 wherein the number of strands of the mesh layer in the x and y directions is in the range from about 10 to about 30 per inch.

18. A filter element as claimed in claim 15 wherein the polymeric mesh layer comprises polyester, polypropylene, or polyamide.

19. A filter element as claimed in claim 15 wherein the filtering layer has an upstream side and the mesh layer is positioned along the upstream side of the filtering layer.

20. A filter element as claimed in claim 15 wherein the filtering layer has a downstream side and the mesh layer is positioned along the downstream side of the filtering layer.

21. A filter element as claimed in claim 15 wherein the pleated composite further comprises a cushioning layer between the mesh layer and the filtering layer.

22. A filter comprising:
    a filter element having a longitudinal axis and including a porous filter layer having upstream and downstream sides, a porous upstream support and drainage layer positioned on the upstream side of the filter layer, a cushioning layer positioned between the upstream support and drainage layer and the filter layer and comprising a material smoother than the upstream support and drainage layer, a porous downstream support and drainage layer positioned on the downstream side of the filter layer, and a plurality of polymeric beads disposed in regularly spaced, parallel strips on the downstream side of the downstream support and drainage layer, wherein the filter element is corrugated to define pleats having axes which extend generally perpendicular to the beads and the beads have opposing portions within each pleat that are joined to one another; and
    a wrap member comprising one or more strips comprising a strip of material wound at least once around the filter element and joined to the peaks of the pleats so as to restrain movement of the pleats, wherein the wrap member has openings having a total area less than about one-half of the area of a circumscribing surface defined by the pleats.

23. A filter comprising:
    a pleated filter element having a longitudinal axis and including longitudinally extending pleats having peaks and comprising a filter layer having a first side, a porous support and drainage layer disposed on the first side of the filter layer, and a cushioning layer disposed between the filter layer and the support and drainage layer and including a material which is smoother than the support and drainage layer; and a wrap member comprising one or more strips wrapped around the filter element at least once and joined to the peaks of the pleats so as to restrain movement of the pleats and having unobstructed openings for increasing the dirt capacity of the filter element, the openings having a total area less than about one-half of the total area of a circumscribing surface defined by the peaks of the pleats.

24. A filter element as claimed in claim 23 wherein the cushioning layer comprises a smooth, porous non-woven material.

25. A filter as claimed in claim 24 wherein the non-woven material comprises a nylon or a polyester.

26. A filter as claimed in claim 24 wherein the non-woven material comprises a polyester non-woven material with a Hirose Corporation trade designation of 05TH08.

27. A filter element as claimed in claim 23 wherein the support and drainage layer comprises an extruded mesh.

28. A filter comprising:
a filter element having a longitudinal axis and including longitudinally extending pleats having peaks and comprising a pleated composite having a filter layer, a support and drainage layer, and means disposed between the filter layer and the support and drainage layer for resisting abrasion of the filter layer by the support and drainage layer; and a wrap member comprising one or more strips wrapped around the filter element at least once and joined to the peaks of the pleats so as to restrain movement of the pleats and having unobstructed openings for increasing the dirt capacity of the filter element, the openings having a total area less than about one-half of the total area of a circumscribing surface defined by the peaks of the pleats.

29. A filter comprising:
a porous, pleated filter element having a longitudinal axis and having first and second ends and longitudinal pleat axes extending between the first and second ends, wherein the pleated filter element includes a composite having first and second layers, the first layer including a filter medium, and wherein each pleat includes an open end, a bight end, a peak, and opposing sides which extend between the open end and the bight end;

a plurality of polymeric beads which extend along the second layer opposite the first layer and generally perpendicular to the pleat axes, wherein each bead extends from the open end of the pleat along the first side to the bight end and from the bight end along the second side to the open end and wherein the portions of each bead which extend along the first and second sides are joined to one another;

first and second end caps joined to the first and second ends of a pleated filter element; and a wrap member comprising one or more strips wrapped around the filter element at least once and joined to the peaks of the pleats so as to restrain movement of the pleats and having unobstructed openings for increasing the dirt capacity of the filter element, the openings having a total area less than about one-half of the total area of a circumscribing surface defined by the peaks of the pleats.

30. A filter as claimed in claim 29 having about 5 to about 20 beads per inch.

31. A filter as claimed in claim 29 wherein the second layer comprises a support and drainage material.

32. A filter as claimed in claim 29 wherein the polymeric beads comprise a hot-melt adhesive.

33. A filter as claimed in claim 29 wherein the polymeric beads are evenly spaced from one another.

34. A filter comprising:
a filter element having a longitudinal axis and including longitudinally extending pleats having peaks and comprising a pleated composite including first and second extruded polymeric mesh layers, a filtering layer positioned between the first and second mesh layers, a first cushioning layer positioned between the first mesh layer and the filtering layer, and a second cushioning layer positioned between the second mesh layer and the filtering layer; and a wrap member comprising one or more strips wrapped around the filter element at least once and joined to the peaks of the pleats and having unobstructed openings for increasing the dirt capacity of the filer element, the openings having a total area less than about one-half of the total area of a circumscribing surface defined by the peaks of the pleats.

35. A filter element as claimed in claim 34 wherein each mesh layer is in the range from about 0.010 to about 0.025 of an inch thick.

36. A filter element as claimed in claim 34 wherein for each mesh layer the number of strands in the x and y directions is in the range from about 10 to about 30 per inch.

37. A filter element as claimed in claim 34 wherein each polymeric mesh layer comprises polyester, polypropylene, or polyamide.

* * * * *

UNITED STATES PATENT AND TRADEMARK OFFICE
CERTIFICATE OF CORRECTION

PATENT NO. : 5,252,207

DATED : OCTOBER 12, 1993

INVENTOR(S) : MILLER ET AL.

It is certified that error appears in the above-indentified patent and that said Letters Patent is hereby corrected as shown below:

Claim 1, column 13, line 19, change "peats" to --pleats--.

Claim 22, column 14, lines 57 and 58, delete "comprising a strip";

line 58, delete "at least once";

line 59, after "element" insert --at least once--.

Claim 34, column 16, line 37, after "pleats" insert --so as to retrain movement of the pleats--.

Signed and Sealed this

Third Day of May, 1994

Attest:

BRUCE LEHMAN

*Attesting Officer*      *Commissioner of Patents and Trademarks*